Jan. 9, 1923.   1,441,928.
J. H. HUNT.
SYSTEM OF CONTROL FOR ELECTRICAL DEVICES.
FILED MAR. 27, 1919.
2 SHEETS—SHEET 2.

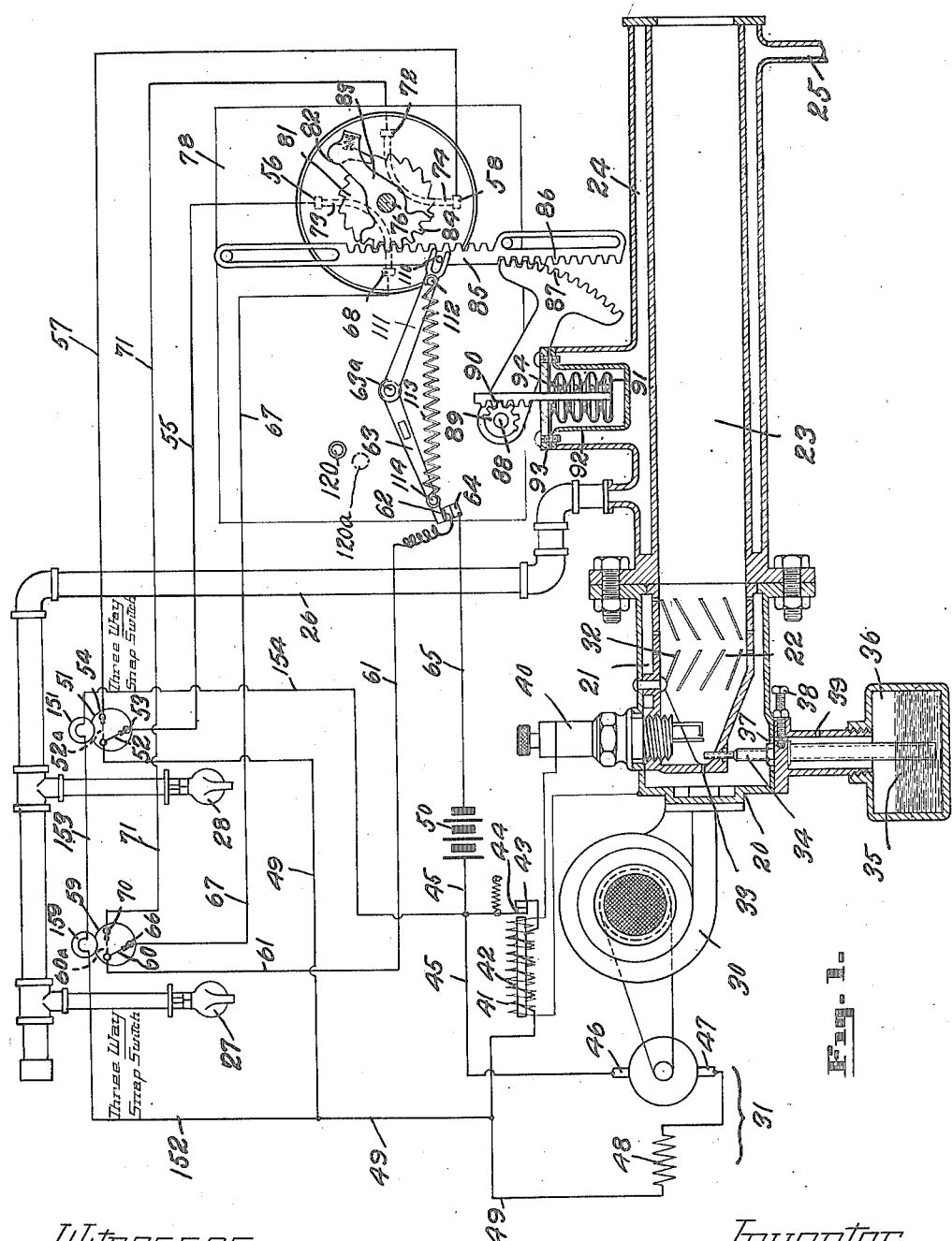

Witnesses
Inventor
John H. Hunt.
By Kerr, Page, Cooper & Hayward.
Attorneys

Patented Jan. 9, 1923.

1,441,928

UNITED STATES PATENT OFFICE.

JOHN H. HUNT, OF DAYTON, OHIO, ASSIGNOR TO THE DAYTON ENGINEERING LABORATORIES COMPANY, A CORPORATION OF OHIO.

SYSTEM OF CONTROL FOR ELECTRICAL DEVICES.

Application filed March 27, 1919. Serial No. 285,661.

*To all whom it may concern:*

Be it known that I, JOHN H. HUNT, a citizen of the United States of America, residing at Dayton, county of Montgomery, State of Ohio, have invented certain new and useful Improvements in Systems of Control for Electrical Devices, of which the following is a full, clear, and exact description.
This invention relates to systems of control for electrically operated devices, such as for example, devices for heating water for domestic purposes.

One of the objects of the invention is to provide manual means for rendering such a device operative when desired, and to provide automatic means for rendering it inoperative in case of failure manually to render it inoperative. Where the invention is applied to an electrically operated water heater, one manner of carrying out this object consists in providing a plurality of manually operable controlling devices which may be placed in separate rooms, and each of which will control the operation of the heater; and in providing an automatic controller operated by a thermostat for turning off the heater when the water or other fluid has reached a predetermined temperature.
Thus, if the operator should fail to turn off the heater after using a quantity of hot water, the heater would be automatically turned off. This automatic controller is so constructed and the system of control is so arranged that, after the automatic controller has operated to turn off the heater, each of the manual controlling devices will be left in a condition whereby they may be operated to turn on the burner again without manipulation of the automatic controller.

Other and further objects and advantages of the present invention will be apparent from the following description, reference being had to the accompanying drawings, wherein a preferred embodiment of the present invention is clearly shown.

In the drawings:

Fig. 1 is an elevational view of a water system including the present invention, the water heater being shown in section, and together with a wiring diagram of the electric circuits included in the system.

Figure 4:
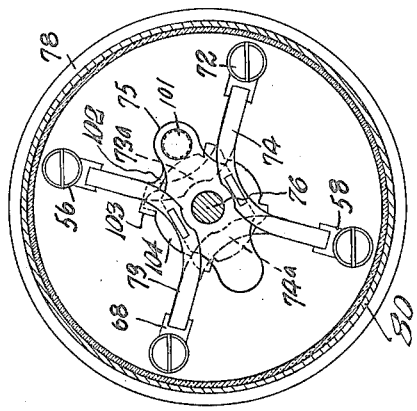
Fig. 4 is a sectional view taken on line 4—4 of Fig. 2.
Figure 3:
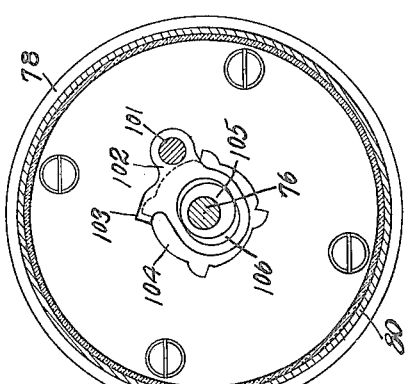
Fig. 3 is a sectional view taken on line 3—3 of Fig. 2.
Figure 2:
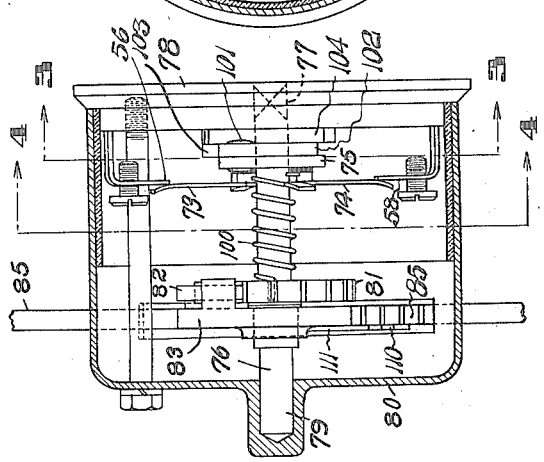
Fig. 2 is a side elevation of the automatic switch, certain parts being shown in section.

In the drawings, a liquid fuel burner 20, including an air receiving chamber 21 and a combustion chamber 22, is connected with a fire tube 23 around which is placed a water packet 24. The water or other liquid to be heated enters jacket 24 through pipe 25 and is conducted out through pipe 26 to a conduit system having faucets 27 and 28. Air for combustion and fuel atomizing purposes is furnished by a fan blower 30 which is driven by a motor 31. Air under pressure is conducted from blower 30 to air receiving chamber 21, a portion of this air entering the combustion chamber 22 through the slits 32 formed in the wall of the combustion chamber. Air for atomizing purposes enters the combustion chamber through the aperture 33 and blows into a spray the liquid which is forced upwardly through a pipe 34 extending down into a quantity of fuel 35 located in the fuel chamber 36.

Fuel is elevated from fuel chamber 36 to the atomizing level in combustion chamber 22 by means of air pressure. A portion of air in the chamber 21 is conducted to the fuel chamber through a passage 37 which is adjusted by screw 38. The chamber is also provided with a bleeder orifice 39 which cooperates with passage 37 to obtain the desired reduction of air pressure in the chamber 36. The particular function of these orifices is described in my co-pending application, Serial No. 285,662 filed March 27, 1919.

The ignition of the fuel is accomplished through the agency of a spark plug 40 connected with ignition coil secondary winding 41. Ignition coil primary winding 42 is connected with stationary contact 43 which operates with a vibrator 44. Vibrator 44 is connected with wire 45 which also connects motor brush 46 with the battery 50. Motor brush 47 is connected with motor field winding 48 which is connected by wire 49 with certain of the controlling devices to be described. Primary winding 42 is also connected with wire 49.

A three-way switch 51 is provided with a switch arm 52 connected with wire 49. Arm 52 may cooperate with contact 53 which is connected by wire 55 with automatic switch contact 56, or with switch contact 54 which is connected by wire 57 with automatic switch contact 58. A three-way switch 59 includes switch arm 60 which is connected by wire 61 with a movable contact 62 mounted upon a pivotally mounted arm 63 but insulated therefrom. Contact 62 cooperates with a contact 64 which is connected by wire 65 with battery 50. Arm 60 may cooperate with stationary contact 66 connected by wire 67 with an automatic switch contact 68, or with stationary contact 70 connected by wire 71 with automatic switch contact 72.

Switch contacts 68, 56, 72 and 58 are arranged to be connected in opposite pairs by switch blades 73 and 74 which are mounted upon plate 75 (see Fig. 4) but insulated therefrom and from each other. Plate 75 is loosely journalled upon shaft 76 which turns in a bearing 77 formed in the base 78 of the automatic switch and in a bearing 79 formed in the switch cover 80. Shaft 76 carries ratchet wheel 81 with which cooperates a ratchet pawl 82 pivotally mounted upon a pawl plate 83 which is loosely journalled upon shaft 76. Plate 83 is provided with a gear segment 84 which engages with rack 85 provided with a tooth portion 86 engaging gear segment 87. Segment 87 is pivotally mounted at 88 and carries a pinion segment 89 meshing with a rack 90. Rack 90 is connected at its lower end with a "sylphon" bellows 91 which is mounted within a cup 92 adapted to hold a quantity of ether or similar substance which expands readily under the action of heat. Cup 92 is mounted so as to come in direct contact with the water or other liquid in the jacket 24 and is provided with a cover 93. A spring 94 interposed between the bellows and the cover 93 tends to resist the movement of the rack 90 due to the action of heat.

The ratchet wheel 81 is connected with the switch blade plate 75 by means of a spring 100 which tends to produce relative movement between said ratchet and said plate. In order to prevent this movement at certain times the plate 75 carries a stud 101 upon which is pivotally mounted a latch 102. Latch 102 is provided with a finger 103 which extends beyond the plane of latch 102 and projects over the edge of a stationary latch plate 104 which is mounted upon the base 78. In order that the latch 102 may be released by turning shaft 76, said shaft 76 is provided with an eccentric 105 which is located within an elongated hole 106 formed in said latch plate 102. It is apparent that by turning shaft 76 in a clockwise direction that the latch 102 will be swung free of the latch plate 104 and will permit the plate 75 to move 90°. When this occurs the switch blades 73 and 74 will be quickly snapped around so as to effect circuit connections between the stationary switch contacts in a different arrangement. Rack 85 carries a pin 110 which cooperates with a forked lever 111 which is pivotally mounted upon the base 78 of the automatic switch. Lever 111 carries a stud 112 which is connected by spring 113 with stud 114 carried by lever 63.

The operation of the invention is as follows:

Assuming that the switch arms 52 and 60 are in the positions shown in Fig. 1, current will flow from the battery 50 to the motor through the following circuit: battery 50, wire 45, brush 46, brush 47, series field 48, wire 49, switch arm 52, contact 53, wire 55, contact 56, blade 73, contact 68, wire 67, contact 66, arm 60, wire 61, contact 62, contact 64, wire 65 to battery 50. When this circuit has been completed the motor 31 will operate the blower 30 causing fuel to be elevated from chamber 36 from the atomizing lever and the combustion chamber 32 where said fuel is blown out toward the tube 23 in the form of a spray and mixed with combustion air entering the passages 32. Current for fuel ignition purposes is supplied from battery 50 through the following circuit: wire 45, vibrator 44, contact 43, primary winding 42, wire 49 to wire 65 through the connections just described, and thence to battery 50. The action of the vibrator 44 in interrupting the primary circuit will cause a shower of sparks to occur at the spark plug 40. Fuel will be ignited and will burn in a long flame extending some distance into the tube 23. The walls of the tube will be quickly heated and will transmit heat to the water or other fluid in the jacket 24. Hot water may then be drawn off from either of the faucets 27 or 28.

The switches 51 and 59 are located conveniently near the faucets 28 and 27, respectively, so that all that is required to operate the system is to close the circuit by either of these switches and then turn on the water which will begin to run hot in a very short time. When a sufficient quantity of hot water has been obtained and it is desired to turn off the blower, this may be accomplished by moving either of the switch arms 52 or 60. The switches 51 and 59 are three-way snap switches, the construction of which is well known. It is to be understood that switch arms 52 and 60 will occupy either the positions shown in full lines in Fig. 1, or the dotted line positions 52ᵃ and 60ᵃ, respectively, wherein said contact arms 52 and 60 will engage contacts 54 and 70 respectively.

If the operator should forget to turn off the blower in the manner described, the blower will be turned off automatically by the automatic temperature control switch, the operation of which will now be described. Initially, the temperature of the water in the heater is at or below a certain temperature which will be known as normal temperature. The bellows 91 and parts connected therewith will occupy the position shown in Fig. 1. At a certain predetermined temperature of the water, which shall be known as the intermediate temperature, the ether or other liquid contained within the cup 92 will have expanded to such an amount as to cause the rack 90 to move upwardly and to impart through members 89, 87, 86 and 85, sufficient clockwise rotation to pawl arm 83 to cause the ratchet 81 to move sufficiently to effect the release of latch 102. When this predetermined intermediate temperature has been reached, the plate 75 will be rotated 90° causing the blades 73 and 74 to be moved into positions 73ª and 74ª, respectively, as shown in Fig. 4. Contacts 56, 72, 58 and 68 will then be bridged. With switch blades 73 and 74 at 73ª and 74ª, respectively, and assuming that switches 52 and 60 have been left in the full line position, shown in Fig. 1, the circuit from the battery to the motor and ignition apparatus will be interrupted. It is to be observed, however, that the circuit connections have been rearranged by the automatic switch so that all that is necessary to start the heater is to turn either of the switches 52 or 60 into the positions 52ª or 60ª, respectively. For example, if blades 73 and 74 are in positions 73ª and 74ª, respectively, and switch arm 60 is left in contact with contact 66, the blower circuit may be closed by moving switch arm 52 into position 52ª where it is in engagement with contact 54. The circuit from the battery to the motor will then be as follows: battery 50, wire 45, brush 46, brush 47, motor field 48, wire 49, arm 52ª, contact 54, wire 57, contact 58, blade 74ª, contact 68, wire 67, contact 66, switch arm 60, wire 61, contact 62, contact 64, wire 65 and battery 50. Assuming that switch blades 73 and 74 are in the positions referred to, and that switch arm 52 remains in engagement with contact 53, by moving contact 60 into position 60ª where it will engage contact 70, the following circuit between the motor and the battery will be established: battery 50, wire 45, brush 46, brush 47, motor field 48, wire 49, switch arm 52, contact 53, wire 55, contact 56, blade 73ª, contact 72, wire 71, contact 70, switch arm 60ª, wire 61, contact 62, contact 64, wire 65, and battery 50.

Thus it is apparent that means have been provided for controlling the heater at a plurality of locations, and that in case the heater is not shut off manually, the heating will be stopped automatically upon the attainment of a predetermined intermediate temperature of the liquid to be heated. Furthermore this automatic device does not interfere with the subsequent operation of the manual controlling devices but leaves them in such a condition that they may be operated further to control the burner.

After the burner has been turned off automatically in the manner described the temperature of the water will decrease until the thermostatically controlled elements will return to their positions, shown in Fig. 1. However, it is possible that further demands for hot water will be made before the water will have cooled off sufficiently for the thermostatically controlled elements to return to the normal positions shown in Fig. 1. If after such further demand the operator should carelessly leave the circuit connections closed between the battery and motor, it is obvious that a considerably higher temperature of the water would need to be attained before sufficient motion could be imparted to the switch shaft 76 to open the blower circuit. In order to prevent the temperature of the water reaching a value which would be excessive, further means are provided for opening the circuit between the battery and the motor upon the attainment of a predetermined maximum temperature of the water. When this device operates the manually controlled switches will be rendered ineffective to start the burner again until the operator has been put to the inconvenience of restoring the automatic switch to its normal position. This inconvenience to which the operator is put will serve as a reminder in the future not to forget to turn off the burner by means of the manual switches. This result is accomplished in the following manner:

The relation of levers 63 and 111 and the spring 113 is such that when the predetermined intermediate temperature of the water is reached, such as to effect the throwing of such blades 73 and 74 in the manner described, the arm 111 will be moved upwardly but not sufficiently to cause the axis of spring 113 to move above the pivot 63ª. But as the temperature of the water exceeds the predetermined intermediate value, the rack 85 will continue to move upwardly and finally cause the axis of spring 113 to move above the pivot 63ª, when a predetermined maximum temperature is reached. This will cause the arm 63 to move upwardly against stud 120 and to interrupt the circuit by separating the contacts 62 and 64. The circuit between the battery motor and ignition apparatus is now interrupted in such a fashion that the switches 51 and 59 are inoperative to close the circuit. The burner will cease to operate and the temperature of the water will decrease until the lever 111 returns to the position shown in Fig. 1.

The lever 63, however, will be held against the stud 120 by spring 113 with sufficient pressure to keep the circuit open notwithstanding that the temperature of the water has decreased to normal value. It is necessary for starting the burner again to manually restore the lever 63 to its normal position. In this manner the burner and heater will be protected from damage which might result from the water becoming too hot, and the inconvenience to the operator ensuing from the necessity of restoring the lever 63 to normal position may act as a reminder to the operator to manually turn off the burner when not in use.

However, it may be desired in every instance to turn off the burner automatically and at the same time arrange the electrical circuits so that manual control can be effected without any resetting operation. To accomplish this result the stud 120 is located at 120ª, (see Fig. 1). Now when the predetermined maximum temperature is reached, the lever 111 will have moved upwardly to bring the axis of spring 113 above the pivot 63ª causing lever 63 to move upwardly to break the circuit and shut off the burner. The thermostat will cool off causing the movable elements associated therewith to return to their normal positions, shown in Fig. 1. In this form of the invention the spring 113 will restore lever 63 automatically to circuit closing position whereupon the burner will operate for a short period to heat the thermostat to the intermediate temperature whereupon the switch shaft 76 will be moved sufficiently to effect the opening of the circuit in the manner described. This automatic control protects the heating system since opportunity for cooling off the burner and liquid container is afforded during the lapse of time necessary for the spring 113 to be restored to normal position.

Where a plurality of three-way switches are employed to effect the remote control of the burner, a signal device is provided for indicating whether or not the burner is already in operation. Switches 51 and 59 are provided with lamps 151 and 159, respectively, which are connected in series by wire 153, and in shunt with the motor and ignition coil by wires 152 and 154. Whenever current is flowing from the battery the lamps 151 and 159 will burn. Therefore, for example, if the same one desiring to obtain water from faucet 27 has turned on the burner by means of switch 59, any one desiring to obtain water from faucet 28 will know by observing the lighted lamp 151 that the burner is already on and that it is not necessary to operate the switch 51. Where faucets and switches are located at such a distance from the burner that its operation is not audible, if such signal device were not provided, confusion would result as one operator might turn off the burner while another would be trying to obtain a supply of hot water.

While the form of mechanism herein shown and described constitutes a preferred form of embodiment of the invention, it is to be understood that other forms might be adopted, all coming within the scope of the claims which follow.

I claim:

1. In a system of control for electrically operated heaters, the combination with a heater having electrical operating provisions; of manual means for rendering the electrical provisions operative; and automatic temperature controlled means for rendering said electrical provisions inoperative, said automatic means being ineffective to render said provisions operative until rendered operative again by said manual means.

2. In a system of control for electrically operated heaters, the combination with a heater having electrical operating provisions; of a plurality of manual devices each operable to render the electrical provisions operative; and automatic temperature controlled means for rendering said electrical provisions inoperative, said automatic means being ineffective to render said provisions operative until rendered operative again by either of said manual devices.

3. In a system of control for electrically operated heaters, the combination with a heater having electrical operating provisions; of a plurality of manual devices each operable to render the electrical provisions operative; and automatic means operable at a certain temperature for rendering said electrical provisions inoperative, said automatic means being ineffective to render said provisions operative until rendered operative again by either of said manual devices, said automatic means being operable at a predetermined higher temperature to render said provisions inoperative and said manual devices ineffective further to render said provisions operative.

4. In a system of control for electrically operated heaters, the combination with a heater having electrical operating provisions; of manual means for rendering the electrical provisions operative; and automatic means operable at a certain temperature for rendering said electrical provisions inoperative, said automatic means being ineffective to render said provisions operative until rendered operative again by said manual means, said automatic means being operable at a predetermined higher temperature to render said provisions inoperative and said manual means ineffective further to render said provisions operative.

5. In a system of control for electrically operated heaters, the combination with a liquid fuel burner, a motor operated air pump and ignition devices for said burner; a battery; manual means for connecting the battery with the motor and ignition devices; and automatic temperature controlled means for disconnecting said battery, said means being ineffective to connect the same again until connected by said manual means.

6. In a system of control for electrically operated heaters, the combination with a liquid fuel burner, a motor operated air pump and ignition devices for said burner; a battery; of a plurality of manual switches each operable to connect the battery with the motor and ignition devices; and automatic temperature controlled means for disconnecting said battery, said means being ineffective to connect the same again until connected by either of said manual switches.

7. In a system of control for electrically operated heaters, the combination with a liquid fuel burner, a motor operated air pump and ignition devices for said burner; a battery; of a plurality of manual switches each operable to connect the battery with the motor and ignition devices; and automatic means operable at a certain temperature for disconnecting said battery and ineffective to connect the same again until connected by either of said manual switches, said automatic means being operable at a predetermined higher temperature to disconnect the battery and to render said switches ineffective to connect the battery with the motor and ignition devices.

8. In a system of control for electrically operated heaters, the combination with a liquid fuel burner, a motor operated air pump and ignition devices for said burner; a battery; manual means for connecting the battery with the motor and ignition devices; and automatic means operable at a certain temperature for disconnecting said battery and ineffective to connect the same again until connected again by said manual means, said automatic means being operable at a predetermined higher temperature to disconnect the battery and to render said manual means ineffective to connect the battery with the motor and ignition devices.

9. In a heating system, the combination with a burner and a fluid container; of devices for manually controlling the burner; and temperature controlled means for automatically turning off the burner while permitting said manual devices further to control said burner; and means for indicating the status of the burner at each of said manual devices.

10. In a heating system, the combination with a liquid fuel burner, a motor operated air pump and ignition devices for the burner; of a battery; a plurality of manually operated switches each for connecting the battery with said motor and ignition devices; and a temperature controlled switch for disconnecting said battery while permitting said manual switches further to control said burner; and means for indicating the status of the burner at each of said manual switches.

11. In a heating system, the combination with a burner and a fluid container heated thereby; of a manually operable device having a plurality of operating positions for controlling the burner; and automatic means including instrumentalities responsive to temperature changes in the fluid for stopping the burner, said device being movable to start the burner without a return of the said instrumentalities to their initial position.

12. In a heating system, the combination with a liquid fuel burner, a motor operated air pump and ignition devices for the burner; of an electrical circuit including a battery; a plurality of manually operable switches, each of which is adapted to complete the circuit through the battery, motor and ignition device; and a temperature controlled switch for breaking the circuit, any one of said switches being operable then to complete the circuit.

13. In a heating system, the combination with a burner and a fluid container heated thereby; of an electrical circuit controlling the burner and including a manually operable switch having a plurality of operable positions for completing the circuit; and an automatic mechanism responsive to temperature changes in the fluid for breaking the circuit and stopping the burner, the switch being operable then to complete the circuit.

14. In a heating system, the combination with a burner and a fluid container heated thereby; of an electrical circuit controlling the burner and including a manually operable switch having a plurality of operable positions for completing the circuit; and an automatic mechanism responsive to temperature changes in the fluid for breaking the circuit and stopping the burner, the switch being operable then to complete the circuit, said mechanism being operable at a relatively high temperature of the fluid to again open the circuit and prevent a starting of the burner by operation of the switch.

15. In a control for electrically operated fluid heaters, instrumentalities responsive to temperature changes in the fluid; and means operated by said instrumentalities and adapted to render a heater inoperative at each of a plurality of predetermined temperatures of the fluid.

16. In an electrical control for burners, the combination with a fluid chamber adapted to be heated by a burner; of an electrical circuit controlling the burner and comprising a manually operable switch having a plurality of circuit closing positions; an automatic switch responsive to temperature changes in the chamber and having a plurality of circuit closing positions; and a plurality of current paths between said switches whereby a circuit broken along one of said paths may be completed along another of the paths by operation of the manually operable switch.

17. In an electrical control for burners, the combination with a fluid chamber adapted to be heated by a burner; of an electrical circuit controlling the burner and comprising a manually operable switch having a plurality of circuit closing positions; an automatic rotary switch responsive to temperature changes in the chamber and having a plurality of successive circuit closing positions; and a plurality of current paths between said switches whereby a circuit broken along one of said paths may be completed along another of the paths by operation of the manually operable switch.

18. In an electrical control for burners, the combination with a fluid chamber adapted to be heated by a burner; of an electrical circuit controlling the burner and comprising a manually operable switch having a plurality of circuit closing positions; an automatic rotary switch responsive to temperature changes in the chamber only during increase in the temperature thereof and having a plurality of circuit closing positions; and a plurality of current paths between said switches whereby a circuit broken along one of said paths may be completed along another of the paths by operation of the manually operable switch.

19. In an electrical control for burners, the combination with a fluid chamber adapted to be heated by a burner; of an electrical circuit controlling the burner and comprising a manually operable switch having a plurality of circuit closing positions; an automatic switch responsive to temperature changes in the chamber and having a plurality of circuit closing positions; a plurality of current paths between said switches whereby a circuit broken along one of said paths may be completed along another of the paths by operation of the manually operable switch; and automatic means for breaking a circuit along any of said paths.

20. In a heating system, the combination with a liquid fuel burner, a fluid chamber heated thereby, and a single source of electrical current; of an electrical circuit comprising a switch responsive to temperature changes in the fluid heated; a manually operable switch; and connections between the switches, the burner and the source of current whereby an electrical circuit broken by operation of the automatic switch may be completed by operation of the manually operable switch.

21. In a heating system, the combination with a liquid fuel burner, a fluid chamber heated thereby, and a source of electrical current; of an electrical circuit comprising a circuit breaking switch responsive to temperature changes in the fluid heated; a plurality of manually operable switches; and connections between the same, the burner and the current source whereby an electrical circuit broken by operation of the automatic switch may be completed by operation of any of said manually operable switches.

22. In a heating system, the combination with a liquid fuel burner, a fluid chamber heated thereby, and a source of electrical current; of an electrical circuit comprising a circuit breaking switch responsive to temperature changes in the fluid heated; a plurality of manually operable switches; and connections between the same, the burner and the current source whereby an electrical circuit broken by operation of one of said manually operable switches may be completed by operation of another manually operable switch.

23. In a heating system the combination with a liquid fuel burner, a fuel chamber heated thereby, and a single source of electrical current; of a plurality of manually operable switches, each having a plurality of circuit closing positions; an automatic rotary switch having successive operative positions and responsive to temperature changes in the liquid heated to break a circuit made by any of said switches; and connections between the switches, the burner and the current source whereby a circuit broken by movement of the rotary switch to its next position may be completed by operation of any of said manually operable switches.

24. In a system of control for electrically operated burners, the combination with a burner, and a source of electrical current; of an electrical circuit comprising two manually operable switches; and an automatic temperature controlled switch connected in series between the two manually operable switches whereby after operation of the automatic switch to break the circuit, either manually operable switch may be moved to again complete the circuit.

25. In a heating system the combination with a liquid fuel burner, a fluid chamber heated thereby, and a source of electrical current; of an electrical circuit comprising a manually operable switch; temperature controlled circuit breaking means operable at a moderate and at a relatively high temperature to break the circuit; and connections between the switch, circuit breaking means, the burner and the source of current whereby the circuit is automatically broken at a relatively low temperature in the fluid heated, may be completed again by operation of the manually operable switch without a substantial lowering of the temperature of the fluid, and will be broken again automatically upon an abnormal increase in temperature of the fluid.

26. In a heating system the combination with a liquid fuel burner, a fluid chamber heated thereby, and a source of electrical current; of an electrical circuit comprising circuit breaking means responsive to temperature changes in the fluid heated to break the circuit at two different temperatures; a plurality of manually operable switches each having a plurality of circuit closing positions; and connections therebetween including a plurality of current paths between the switches and circuit breaking means whereby a circuit broken at the lower temperature by movement of the said means may be made by operation of any of the switches and a circuit broken at the higher temperature cannot be made by operating said switches.

27. In a heating system the combination with a burner and a chamber heated thereby; of a source of current, an electrical circuit comprising two manually operable switches each having a plurality of circuit closing positions; and a temperature controlled circuit breaking mechanism including two automatically operated temperature controlled switches one of which is connected to the two switches by a plurality of current paths whereby a circuit broken by the said automatic switch may be completed by operation of a manually operable switch, and the other of said automatic switches being operable only at high temperatures in the medium heated to break the circuit and hold it open until the temperature of the medium has decreased.

28. In an electrically operated heater, current controlling means comprising an electrical circuit; a manually operable switch having a plurality of operable positions for completing the circuit; and a circuit controlling device including instrumentalities responsive to changes in temperature of the medium heated to break a circuit made by said switch in any one of its operative positions and to reform the circuit whereby it may be completed by said switch in another of its operative positions.

In testimony whereof I affix my signature.

JOHN H. HUNT.

Witnesses:
 HAZEL SOLLENBERGER,
 MILDRED PEARE.